United States Patent [19]
Rossi et al.

[11] Patent Number: 4,781,566
[45] Date of Patent: Nov. 1, 1988

[54] APPARATUS AND RELATED METHOD FOR ALIGNING IRREGULAR BLANKS RELATIVE TO A DIE HALF

[75] Inventors: Alfred F. Rossi, Weston, Conn.; Albert D. Johns, Roselle Park, N.J.; Ronald P. Marx, Appleton, Wis.

[73] Assignee: James River Corporation, Richmond, Va.

[21] Appl. No.: 117,826

[22] Filed: Nov. 9, 1987

[51] Int. Cl.⁴ .............................. B29C 51/00
[52] U.S. Cl. .................... 425/400; 72/361; 72/420
[58] Field of Search ............ 425/395, 397, 400; 493/902; 72/361, 420

[56] References Cited

U.S. PATENT DOCUMENTS

| | | |
|---|---|---|
| 228,554 | 6/1980 | Perkins et al. . |
| 584,633 | 6/1897 | Gottlieb . |
| 1,733,445 | 10/1929 | Burns .................... 72/361 |
| 1,838,061 | 12/1931 | Schwaerzer .............. 72/361 |
| 2,731,860 | 1/1956 | Schaming . |
| 4,073,391 | 2/1978 | O'Brien et al. . |
| 4,358,263 | 11/1982 | Shiraishi et al. ........... 425/397 |
| 4,435,143 | 3/1984 | Dempsey ................ 425/400 |

Primary Examiner—Lowell A. Larson
Attorney, Agent, or Firm—Finnegan, Henderson, Farabow, Garrett & Dunner

[57] ABSTRACT

A device for aligning an elliptical blank relative to a female die half comprising a drawpad having an elliptical opening supporting a blank in position on a female die half. Alignment pins are movable rearwardly of the minor diameter of the blank within slots formed in the drawpad for engaging the perimeter of the blank for rotating the blank to the aligned position, in preparation for press forming the blank into the desired shape.

14 Claims, 3 Drawing Sheets

APPARATUS AND RELATED METHOD FOR ALIGNING IRREGULAR BLANKS RELATIVE TO A DIE HALF

BACKGROUND OF THE INVENTION

The present invention relates to the positioning of pre-cut blank sheet materials prior to press forming between die halves, and, more particularly, to an apparatus and related method for positioning irregular blanks into aligned position with respect to a die half.

Prior to fabricating formed containers, such as disposable food service plates made of paperboard, by pressing a pre-cut blank between forming dies into the desired shape, it is important to position the blanks in aligned position with respect to the female die half. The usual press forming process is automated and can be operated in a gravity-feed mode in which a blank is allowed to enter the press or die set, is aligned by means including a drawpad in a position relative to the female die half, is press formed into the finished product and then ejected or dropped from the die. The next blank is allowed to enter and the press forming cycle is repeated. Proper alignment of the blank is essential to press form the blank into a finished product having the proper shape and other characteristics such as structural integrity. While simple stationary alignment or guide means are usually sufficient to enable square, rectangular or circular shaped blanks to self-align as they enter the press, blanks having irregular shapes, such as an ellipse, frequently become misaligned which can result in a defective or non-uniform finished product. Included among the problems which result from the inability of irregular shaped blanks to self-align, prior to press forming, are finished products with unevenly shaped outer edges, and which do not stack uniformly.

In providing an apparatus for moving an irregular blank into aligned position relative to a die half, it is important to provide for different drawpads and die halves associated with the various sizes and shapes of the finished product. It is also important to provide alignment means for moving an irregular blank from an initial misaligned position into an aligned position with respect to the major and minor axes of a die half and for holding the blanks in the aligned position upon mating of both die halves. Further, it is important that the alignment means not interfere with the ejection of the finished product from between the die halves after pressing, nor with the insertion of new blanks into position prior to pressing.

SUMMARY OF THE INVENTION

An object of the present invention is to provide a simple and reliable means of aligning an irregular blank with respect to major and minor axes of a die half.

Another object is to provide alignment means which are interchangeable relative to different drawpads and die halves associated with various shapes and sizes of finished product.

To achieve the foregoing objects, and in accordance with the invention as embodied and broadly described herein, an apparatus and related method for aligning an irregular blank or workpiece in position relative to a die half is provided comprising a base for supporting a die half; a drawpad mounted on the base for supporting an irregular blank in position relative to a die half which drawpad has an opening with major and minor axes for supporting a blank having a configuration corresponding to the opening and dimensioned to overlap the periphery of said opening, the blank having an outer edge defining a predetermined uniform annular width surrounding the opening at times when a blank is in an aligned position relative to the die half, the drawpad opening being defined by forward and rearward end portions on opposite sides of the minor axis thereof each having a corresponding pair of quadrants defined by the intersection of the major and minor axes of the drawpad opening; initial alignment means mounted on the drawpad adjacent the periphery of the opening for positioning the blank in the position supported by the drawpad; a pair of guide means with the guide means disposed on opposite sides of the major axis of the opening adjacent each of the rearward quadrants, the guide means each movable along a path extending inwardly toward the other guide means at an acute angle to the respective radii of the major and minor axes, from a first position outside the outer edge of said overlap, to a second position corresponding to the outer edge of the overlap, for contacting with a portion of perimeter of the blank and moving the blank into aligned position relative to the die half; and means for moving the guide means between the first and second positions along the path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings which are incorporated in and constitute a part of the specification, illustrate a preferred embodiment of the invention and, together with the summary description given above and the detailed description of the preferred embodiment including the appended claims given below, serve to explain the principles of the invention.

DESCRIPTION OF THE PREFERRED EMBODIMENT

Figure 1:
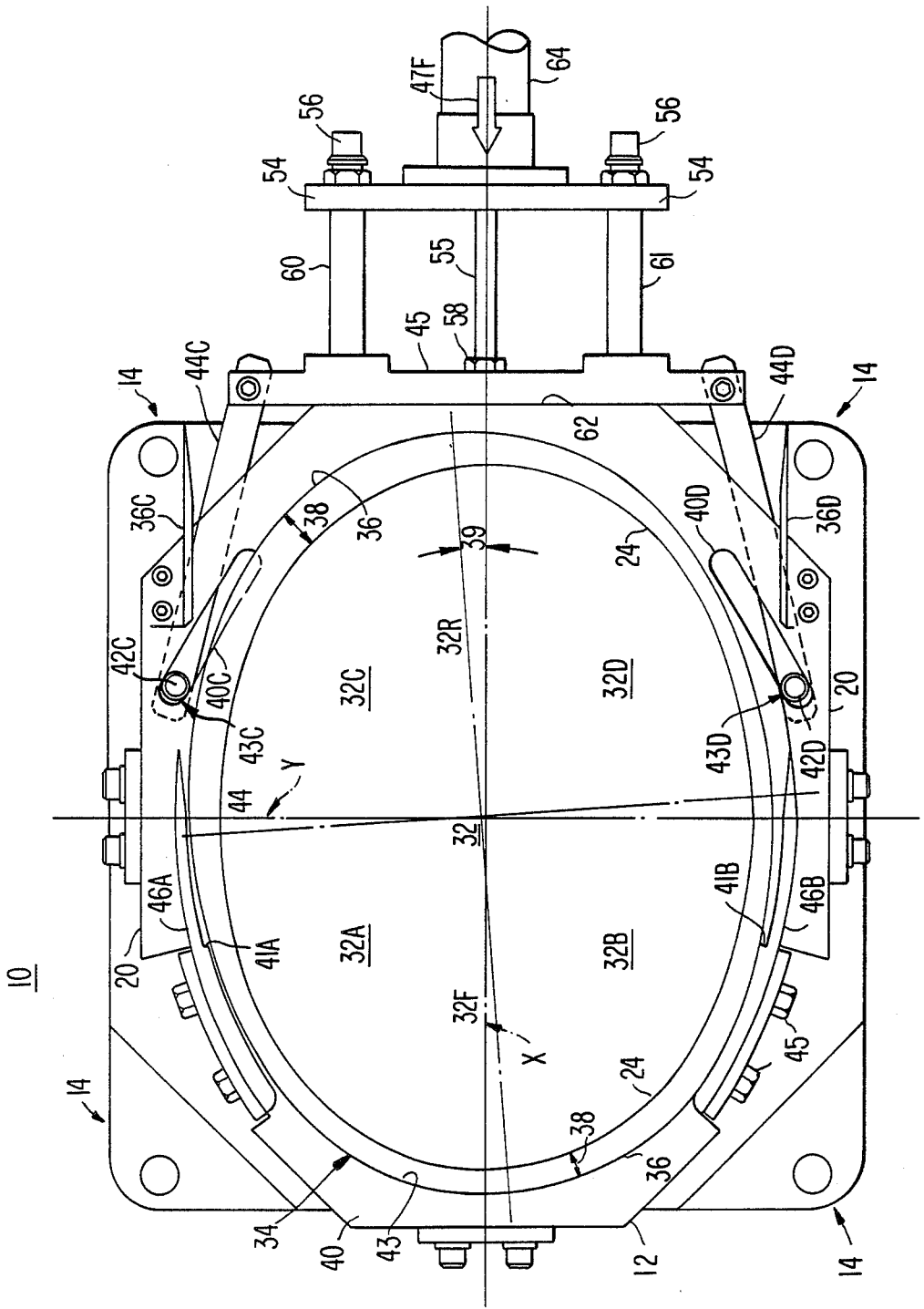
FIG. 1 is a plan view of a device for aligning an elliptical blank or workpiece relative to a female die half incorporating the teachings of the present preferred embodiment of the invention, showing the apparatus in an unoperated configuration with a blank inserted in a misaligned position.

Reference will now be made in detail to the present preferred embodiment of the invention, an example of which is illustrated in the accompanying drawings wherein like reference numerals refer to like parts.

Figure 4:
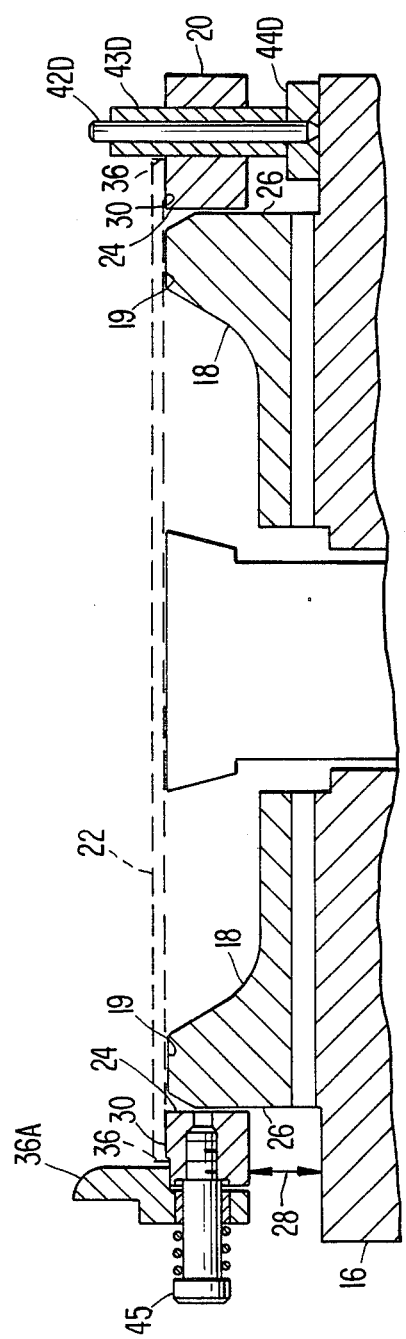
FIG. 4 is an elevation view of the device illustrated in FIG. 1, taken along line B—B' of FIG. 2.

A device for aligning an irregular blank relative to a die half is shown in FIGS. 1–4 and generally represented by the numeral 10. Device 10 includes a drawpad 12 mounted on a female die half 14. Female die half 14 includes a base 16, with a formed die 18 removably attached by conventional means to base 16 (FIG. 4).

The invention includes a drawpad for supporting a blank in position relative to the female die half. The drawpad is mounted on the base and is provided with an opening with major and minor axes for supporting a blank having a configuration corresponding to the opening and dimensioned to overlap the periphery of the opening, the blank having an outer edge defining a predetermined annular width surrounding the opening at times when the blank is in an aligned position relative to the die half, the drawpad opening being defined by forward and rearward end portions on opposite sides of the minor axis thereof, each portion having a corresponding pair of quadrants defined by the intersection of the major and minor axes of the drawpad opening.

As embodied herein, drawpad 12 is in the form of a frame having a generally polygonal perimetrical edge 20, and an elliptical opening 32, with a peripheral edge 24. Die member 18 (FIG. 4) is dimensioned relative to opening 32 of the drawpad 12 such that peripheral edge 24 of drawpad 12 slidably fits around the exterior surface 26 of die member 18. Drawpad 12 is mounted in a conventional manner to move in directions indicated by arrow 28 (FIG. 4) in response to a male die half being brought into and out of engagement (not shown) with the die member 18 and surface 30 of drawpad 12. Elliptical opening 32 has a major diameter or axis X and minor diameter or axis Y which intersect to form imaginary boundaries defining quadrants 32A, 32B in forward end portion 32F, and quadrants 32C, 32D in the rearward end portion 32R, of drawpad opening 32, as indicated in FIG. 1. An elliptical blank 34 having an outer edge 36 is in position covering opening 32 of drawpad 12, to form an overlap 38. As shown in FIG. 1, blank 34 is misaligned, whereas in FIG. 2, blank 34 is aligned such that peripheral edge 24 and outer edge 36 define a uniform annular width 38 surrounding opening 32.

The invention includes initial alignment means mounted on the drawpad adjacent the periphery of the opening for positioning the blank over the opening in the supported position. In the initial or supported position, blank 34 may be misaligned relative to female die half 14, as depicted in FIG. 1 wherein the major diameter X of blank 34 is offset from major diameter X of opening 32 by a space between arrows 39. As embodied herein, the initial alignment or pre-alignment means include straight guides 36C, 36D adjacent rearward quadrants 32C, 32D, respectively, spaced from each other a distance greater than the length of minor axis Y of drawpad opening 32, for receiving and guiding the blank 34 upon approaching the pre-alignment position relative to drawpad 12, and an abutment member 40 adjacent forward quadrants 32A, 32B that has an inner curved surface portion 43 that follows the curvature of opening 32 in registry with the outer boundary of annular overlap 38. Abutment 40 is disposed to surround the portion of edge 24 defining forward quadrants 32A, 32B of opening 32 to points 41A, 41B forward of minor diameter Y at opposite ends of surface portion 43. Abutment 40 is removably attached by bolts 45 to drawpad 12. Bolts 45 may be spring loaded (see FIG. 4) to permit abutment 40 to be shifted outwardly for dislodging a jammed blank. Abutment 40 has opposing end portions 46A, 46B that are tapered and are spaced outwardly of the outer boundary of overlap 38 to permit a blank, such as 34, to readily drop into position into engagement with surface portion 43 limiting the forward motion of a blank 34 which has been inserted into the initial or pre-alignment position supported by drawpad 12.

As is evident from FIG. 1, the tolerance between the outer boundary of annular overlap 38 and the edge of opposing end portion 46A, 46B, which permit the proper fore and aft positioning of a blank 34 without restriction or jamming, also permits a slight yawing of the blank such that it engages one of the end portions such as 46A at a point 44. As a result, blank 34 is misaligned.

In accordance with the invention, a pair of guide means is provided with the guide means disposed on opposite sides of the major diameter of the opening adjacent each of the rearward quadrants, each of the guide means including a portion movable along a path extending inwardly toward the other guide means at an acute angle to the respective radii of the major and minor axes defining the rearward quadrants, from a first position outside of the outer edge of the overlap, to a second position corresponding to the outer edge of the overlap for contacting a portion of the perimeter of the blank and for moving the blank into the aligned position relative to the die half. According to the invention, the guide means also include means for moving the guide means between the first and second positions along the path.

As embodied herein, the guide means include elongated slots 40C, 40D in drawpad 12 adjacent the rearward quadrant 32C, 32D, respectively, of drawpad opening 32 rearwardly of minor axis Y. Each of the slots commences at a first end 48A, 48B (FIG. 2) in a position outside of the outer boundary of the overlap portion and extends inwardly at an acute angle to the major and minor radii of respective axes X and Y defining rear quadrants 32C, 32D, the inner edge of each slot 40C, 40D being substantially coincident with the tangent of the intersection of the major and minor radii defined by corresponding axes X and Y of opening 32, respectively. The slots should be of such length that a second end 50A, 50B (FIG. 2) permits the guide means to be in registry with the outer boundary of annular overlap 38 for contacting the outer edge 36 of blank 34.

Figure 2:
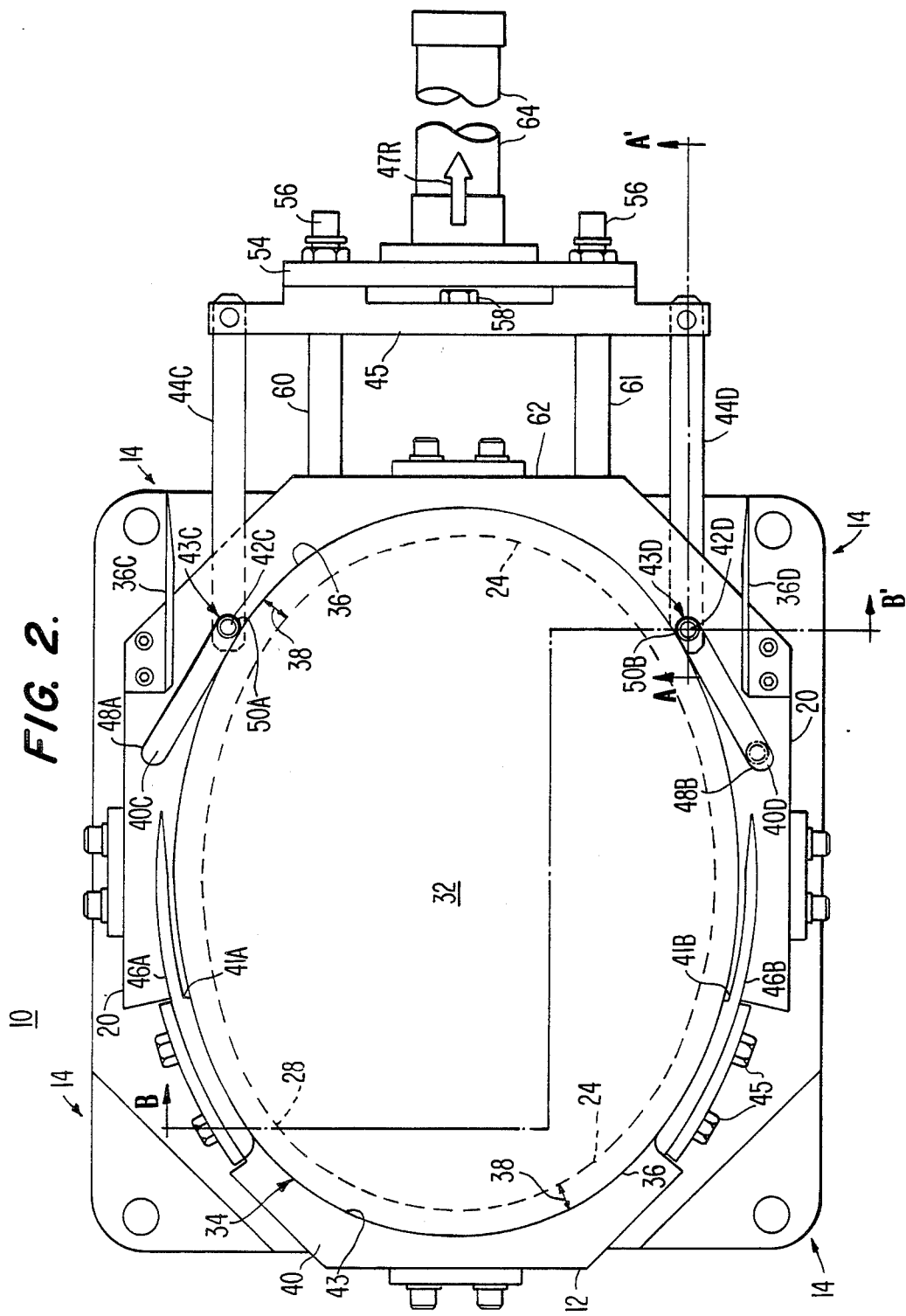
FIG. 2 is a plan view of the device and blank illustrated in FIG. 1, in an operated configuration with the blank in the aligned position.
Figure 3:
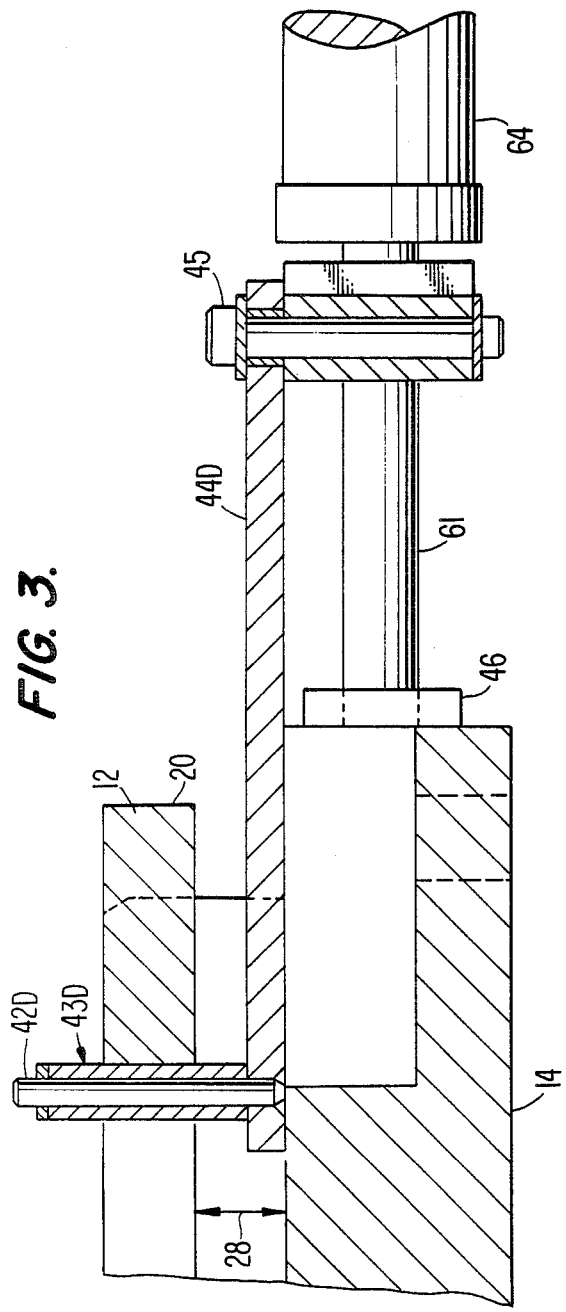
FIG. 3 is an elevation view of the device illustrated in FIG. 1, taken along line A—A' of FIG. 2.

Attached to base 16 at one end thereof are a pair of spaced parallel rods 60, 61 which are secured at their outer ends by a plate 54 secured by threaded nuts 56. Slidably mounted on rods 60, 61 is a yoke 45 that has a central member 55 rigidly fastened at one end by a threaded stop nut 58. At the opposite end is a piston (not shown) operated by air pressure or hydraulic fluid in a conventional manner to move yoke 45 in the direction of arrow 47F, 47R, forward and rearward, respectively, on rods 60, 61 (FIGS. 1 and 2). In a first limit position, yoke 45 engages forward exterior edge 62 of drawpad 12. In a second limit position, yoke 45 engages plate 54. Yoke 45 has a longitudinal axis substantially parallel to the minor diameter Y of the elliptical opening 32 and at the opposite ends of the yoke 45 are connected a pair of elongated links 44C, 44D, which are of equal length and are mounted to pivot about an axis perpendicular to the plane of the drawpad 12.

Attached at opposite ends of the links 44C, 44D are cylindrical alignment pins 42C, 42D, respectively, having an axis which is parallel to the pivotal axis of the corresponding one of links 44C, 44D. Pins 42C, 42D are of such a diameter that they slidably fit in slots 40C, 40D in drawpad 12. Links 44C, 44D are of such a length that the outer diameters of the pins 42C, 42D are in registry with the outer boundary of the overlap 38 when the yoke 45 is in the second limit position. When the yoke 45 is in the first limit position, the pins 42C, 42D are spread in the respective slots 40C, 40D a distance from each other greater than the minor diameter of the outer boundary of the overlap 38. Pins 42C, 42D may include sleeves 43C, 43D which rotate relative to pins 42C, 42D, respectively, when in contact with blank 34, thereby reducing friction during alignment of blank 34.

In operation blanks such as 34 are typically fed by gravity from the rearward end of drawpad 12 adjacent rear quadrants 32C, 32D to slide into position guided by abutment member 40 and coming to rest in position supported by drawpad 12. Following such feeding of blank 34 into the initial position between guide means 46A, 46B, a rotational misalignment of blank 34 may exist relative to female die half 14. As previously discussed, in order to move blank 34 into the aligned position relative to female die half 14, as shown in FIG. 2, air cylinder rod 64 pulls yolk 45 rearwardly in the direction of arrow 47R causing links 44C, 44D to move alignment pins 42C and 42D simultaneously in slots 40C, 40D, respectively, into a position wherein at least one pin contacts a portion of the perimeter of blank 34, thus rotating blank 34, if misaligned, from a misaligned to an aligned position relative to the female die half 14; and urging blank 34 in the proper rotational or angular position against surface 43 of abutment 40 until both pins 42C and 42D are contacting the perimeter of the blank 34 prior to mating of the die halves during the subsequent press forming cycle.

As the male die half (not shown) descends to press blank 34, it engages drawpad 12 forcing it down such that surface 30 of drawpad 12 moves to a position below that of surface 19 of the die member 18 (FIG. 4).

Preferably, alignment device 10, drawpad 12 and female die half 14 are tilted to form an angle (not shown) of substantially 45° with respect to the horizontal with the forward portion being adjacent the horizontal to permit the blanks to drop into position in engagement with surface 43.

Pins 42C, 42D and links 44C, 44D are easily interchangeable for use with different size die members, such as 18, and drawpads, such as 12, for different size blanks.

It will be apparent to those skilled in the art that various modifications, variations and additions can be made in the light fixture of the present invention without departing from the spirit or scope of the present invention. Thus, it is intended that the present invention cover the modifications and variations provided they come within the general scope of the claims and their equivalents.

What is claimed is:

1. A device for aligning an irregular blank relative to a die half, said device comprising:
   a base for supporting a die half;
   a drawpad mounted on said base for supporting an irregular blank in position relative to the female die half, said drawpad having an opening with a major axis and a minor axis for supporting said blank having a configuration corresponding to the opening and dimensioned to overlap the periphery of said opening, said blank having an outer edge defining a predetermined uniform annular width surrounding the opening at times when said blank is in an aligned positioned relative to the die half, said drawpad opening being defined by forward and rearward end portions on opposite sides of the minor axis thereof, said end portions each having a corresponding pair of quadrants defined by the intersection of the major and minor axes of the drawpad opening;
   initial alignment means mounted on the drawpad adjacent the periphery of said opening for positioning the blank in said supported position;
   a pair of guide means with the guide means disposed on opposite sides of the major diameter of the opening adjacent each of the rearward quadrants, each of said guide means including a portion movable along a path extending inwardly toward the other guide means at an acute angle to the respective radii of the major and minor axes defining said rearward quadrants, from a first position outside of the outer edge of said overlap, to a second position corresponding to the outer edge of said overlap for contacting a portion of the perimeter of said blank and moving a supported blank into said aligned position relative to said die half; and
   means for moving said guide means between said first and second positions along said path.

2. A device for aligning an irregular blank relative to a die half, as recited in claim 1, wherein:
   said initial alignment means includes curved abutment means mounted on the drawpad adjacent the periphery of the forward quadrants of the opening for positioning said drawpad relative to the female die half and for limiting the forward motion of said blank inserted into said supported position.

3. A device for aligning an irregular blank relative to a die half, as recited in claim 1, wherein:
   said initial alignment means includes straight guide means mounted on the drawpad adjacent the periphery of the rearward quadrants of the opening for receiving said blank inserted into said supported position and for limiting motion of the blank by contact with the perimeter of the blank.

4. A device for aligning an irregular blank relative to a die half, as recited in claim 1, wherein:
   said guide means comprises an elongated slot in said drawpad, and pin means movable within said slot between said first and second positions for contacting a portion of the perimeter of said blank and moving a supported blank into said aligned position relative to said die half.

5. A device for aligning an irregular blank relative to a die half, as recited in claim 4, wherein:
   said first and second positions are at opposite ends of said elongated slot.

6. A device for aligning an irregular blank relative to a die half, as recited in claim 5, further comprising:
   reciprocating drive means for simultaneously moving each of said pin means between said first and second positions.

7. A device for aligning an irregular blank relative to a die half, as recited in claim 6, wherein:
   said reciprocating drive means includes linkage means for moving said pin means between said first and said second positions along said path.

8. A device for aligning an irregular blank relative to a die half, as recited in claim 4, wherein:
   said pin means include a pair of alignment pins projecting perpendicularly relative to the plane of the drawpad.

9. A device for aligning an irregular blank relative to a die half, as recited in claim 8, wherein:

said pin means includes a rotatable hollow cylindrical sleeve surrounding and of a length corresponding to said alignment pins for minimizing friction between said pins when in contact with said blank.

10. A device for aligning an irregular blank relative to a die half, as recited in claim 9, wherein:
said drawpad is slidably movable up and down a predetermined distance along an axis parallel to said pins.

11. A device for aligning an irregular blank relative to a die half, as recited in claim 1, wherein: said second position corresponds to the tangent point of the major and minor diameters of said blank.

12. A device for aligning an irregular blank relative to a die half, as recited in claim 1, wherein:
said drawpad and said die half are axially aligned at an angle relative to horizontal.

13. A device for aligning an irregular blank relative to a die half, as recited in claim 12, wherein:
said angle is substantially 45°.

14. A device for aligning an irregular blank relative to a die half, as recited in claim 1, wherein:
the shape of said opening is elliptical.

* * * * *